(12) United States Patent
Yamazaki et al.

(10) Patent No.: US 7,187,420 B2
(45) Date of Patent: Mar. 6, 2007

(54) IMAGE DISPLAY SYSTEM AND METHOD

(75) Inventors: Shunpei Yamazaki, Tokyo (JP); Yoshiharu Hirakata, Kanagawa (JP); Jun Koyama, Kanagawa (JP); Satoshi Teramoto, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 554 days.

(21) Appl. No.: 10/633,676

(22) Filed: Aug. 5, 2003

(65) Prior Publication Data
US 2004/0021800 A1    Feb. 5, 2004

Related U.S. Application Data

(62) Division of application No. 08/730,414, filed on Oct. 15, 1996, now Pat. No. 6,608,652.

(30) Foreign Application Priority Data

| Oct. 14, 1995 | (JP) | ................................. 7-291759 |
| Oct. 14, 1995 | (JP) | ................................. 7-291761 |
| Dec. 20, 1995 | (JP) | ................................. 7-349668 |

(51) Int. Cl.
    H04N 5/74    (2006.01)
(52) U.S. Cl. .................... 348/752; 348/835; 348/792; 348/55; 348/57
(58) Field of Classification Search ............ 348/51–60, 348/792, 832–835, 751, 756, 744, 761, 762, 348/752, 750; 345/103; 359/465, 501, 464; 349/96, 9, 7, 8
See application file for complete search history.

(56) References Cited

U.S. PATENT DOCUMENTS

| 2,832,821 | A |   | 4/1958  | Du Mont |
| 3,858,001 | A |   | 12/1974 | Bonne |
| 4,523,226 | A |   | 6/1985  | Lipton et al. |
| 4,877,307 | A |   | 10/1989 | Kalmanash |
| 4,879,603 | A |   | 11/1989 | Berman |
| 4,954,890 | A | * | 9/1990  | Park ............................ 348/58 |
| 4,957,351 | A | * | 9/1990  | Shioji .......................... 349/15 |
| 5,007,715 | A | * | 4/1991  | Verhulst ...................... 349/15 |
| 5,049,987 | A |   | 9/1991  | Hoppenstein |
| 5,121,983 | A |   | 6/1992  | Lee |
| 5,132,839 | A |   | 7/1992  | Travis |
| 5,181,103 | A |   | 1/1993  | Aoyama |

(Continued)

FOREIGN PATENT DOCUMENTS

JP    63-121816    5/1988

(Continued)

Primary Examiner—Michael H. Lee
(74) Attorney, Agent, or Firm—Fish & Richardson P.C.

(57) ABSTRACT

An image display system comprises a first liquid crystal projector which projects a counterclockwise-rotating, circularly polarized light beam to form an image containing specific visual information on a screen and a second liquid crystal projector which projects a clockwise-rotating, circularly polarized light beam to form a white image on the same screen. When viewed with the naked eye, a combination of the two images projected on the screen appears totally white. A viewer wearing a dedicated viewing device equipped with an optical filter which allows counterclockwise-rotating, circularly polarized light to pass through can selectively see the image projected by the first liquid crystal projector.

17 Claims, 14 Drawing Sheets

U.S. PATENT DOCUMENTS

| | | | |
|---|---|---|---|
| 5,376,944 A | * | 12/1994 | Mogi et al. .............. 345/100 |
| 5,541,642 A | | 7/1996 | Ashbey |
| 5,606,455 A | | 2/1997 | Eichenlaub |
| 5,629,806 A | | 5/1997 | Fergason |
| 5,793,470 A | | 8/1998 | Haseltine et al. |
| 5,821,989 A | | 10/1998 | Lazzaro et al. |

FOREIGN PATENT DOCUMENTS

| | | |
|---|---|---|
| JP | 63-158525 | 7/1988 |
| JP | 63-214720 | 9/1988 |
| JP | 04-156419 | 5/1992 |
| JP | 04-170986 | 6/1992 |
| JP | 04-265940 | 9/1992 |
| JP | 04-355716 | 12/1992 |
| JP | 05-173127 | 7/1993 |
| JP | 05-064827 | 8/1993 |
| JP | 05-066622 | 9/1993 |
| JP | 05-313146 | 11/1993 |
| JP | 05-323267 | 12/1993 |
| JP | 06-186556 | 7/1994 |
| JP | 07-084253 | 3/1995 |

* cited by examiner

IMAGE DISPLAY SYSTEM AND METHOD

CROSS-REFERENCE TO RELATED APPLICATION

This application is a divisional application of U.S. application Ser. No. 08/730,414, filed on Oct. 15, 1996 now U.S. Pat. No. 6,608,652, now allowed, which claims the benefit of foreign priority applications filed in Japan, Ser. No. 07-291759, filed Oct. 14, 1995, Ser. No. 07-291761, filed Oct. 14, 1995, and Ser. No. 07-349668, filed Dec. 20, 1995, all of which are incorporated by reference.

BACKGROUND OF THE INVENTION

1. Field of the Invention

The present invention relates to an image display system which is capable of displaying an image on a screen in such a manner that the image can be observed only by a specific viewer or viewers and more particularly to such type of display system that can be made use of when it is necessary to convey image information to a particular person or persons in a public institution. The invention also relates to an image display method using such a system.

2. Description of the Related Art

Display systems represented by liquid crystal devices are known. In the case of such display systems, it is usual that the displayed images are watched by a plurality of viewers simultaneously.

However, where an image is displayed in a public institution for business or educational purposes, there is a case in which it is desired to convey selectively specific pieces of image information to specific viewers only but the conventional display systems can not serve such purposes.

SUMMARY OF THE INVENTION

Accordingly, an object of the present invention is to provide an image display system having a structure such that a plurality of images can be individually observed by a plurality of viewers, and also to provide an image display method using such a system.

According to a first aspect of the invention, the image display system is so constructed that a first image having a first state of polarization and a second image having a second state of polarization are projected with one image superimposed on another, wherein the first image is entirely white.

According to a second aspect of the invention, the image display system is so constructed that a first image having a first state of polarization and a second image having a second state of polarization are projected with one image superimposed on another, wherein the second image contains specific information to be displayed and the first image forms a white pattern to cover a specific part of or the whole of the second image.

According to a third aspect of the invention, the image display system is so constructed that a first image having a first state of polarization and a second image which is time-division displayed and has a second state of polarization are projected with one image superimposed on another, wherein the second image is intended to display specific information and the first image forms a white pattern to cover a specific part of or the whole of the second image.

In any of the image display systems thus constructed, the first and second images may be circularly polarized with clockwise rotation and with counterclockwise rotation, respectively, or vice versa.

Alternatively, the first and second images may be linearly polarized with their planes of polarization intersecting at right angles with each other.

In another alternative approach, the first and second images are circularly polarized in opposite rotating directions, and their rotating directions are alternately reversed in successive time frames under the time-division display scheme. This approach enables a viewer to selectively observe the second image without being disturbed by the white pattern formed by the first image.

In one method of the invention for providing on-screen visual display, a first image having a first state of polarization and a second image having a second state of polarization are projected with one image superimposed on another, the first image being entirely white, wherein a viewer looking through an optical filter which selectively allows light of the second state of polarization to pass through can see the second image.

In another method of the invention for providing on-screen visual display, a first image having a first state of polarization and a second image having a second state of polarization are projected with one image superimposed on another, the first image forming a white pattern just to cover such part of the second image that should be hidden from view of unspecified viewers, wherein a viewer looking through an optical filter which selectively allows light of the second state of polarization to pass through can see the second image.

According to a fourth aspect of the invention, the image display system for projecting a plurality of images on a screen with one image superimposed on another comprises a first liquid crystal projector for alternately projecting mutually differing first and second images having a first state of polarization in successive time frames in accordance with a time-division display scheme, a second liquid crystal projector for projecting a white image having a second state of polarization which differs from the first state of polarization, a first viewing device assigned to a first viewer incorporating a first liquid crystal shutter which opens and closes in synchronism with time-division display operation of the first liquid crystal projector to selectively allow the first image to pass through and a first optical filter which allows the image having the first state of polarization to pass through, and a second viewing device assigned to a second viewer incorporating a second liquid crystal shutter which opens and closes in synchronism with the time-division display operation of the first liquid crystal projector to selectively allow the second image to pass through and a second optical filter which allows the image having the first state of polarization to pass through, whereby the first viewer wearing the first viewing device can selectively see the first image and the second viewer wearing the second viewing device can selectively see the second image, while viewers not wearing such a viewing device can only see the white image.

According to a fifth aspect of the invention, the image display system for projecting a plurality of images on a screen with one image superimposed on another comprises a first liquid crystal projector for alternately projecting images for right and left eyes in successive time frames in accordance with a time-division display scheme, the images having a first state of polarization, a second liquid crystal projector for projecting a white image having a second state of polarization which differs from the first state of polarization, and a viewing device assigned to a viewer incorporating a first liquid crystal shutter which, provided at the right-eye side of the viewing device, opens and closes in synchronism with time-division display operation of the first liquid crystal projector to selectively allow the image for the right eye to pass through, a second liquid crystal shutter which, provided at the left-eye side of the viewing device, opens and closes in synchronism with the time-division display operation of the first liquid crystal projector to selectively allow the image for the left eye to pass through, a first optical filter which, provided at the right-eye side of the viewing device, allows the image having the first state of polarization to pass through, and a second optical filter which, provided at the left-eye side of the viewing device, allows the image having the first state of polarization to pass through, whereby the viewer wearing the viewing device can selectively see a three-dimensional image, while viewers not wearing such a viewing device can only see the white image.

According to a sixth aspect of the invention, the image display system comprises a liquid crystal panel including a plurality of active matrix regions and common peripheral circuits for controlling horizontal and/or vertical scanning operation in the active matrix regions, the active matrix regions and the peripheral circuits being formed on a single substrate, a polarizer for giving a first state of polarization to at least one of images generated by the active matrix regions, a polarizer for giving a second state of polarization to an image other than the images to which the first state of polarization is given, and a projector for projecting the images generated in the active matrix regions of the liquid crystal panel on a screen with one image superimposed on another, wherein at least one of the images generated by the active matrix regions is entirely white.

According to a seventh aspect of the invention, the image display system comprises a liquid crystal panel including a plurality of active matrix regions and common peripheral circuits for controlling horizontal and/or vertical scanning operation in the active matrix regions, the active matrix regions and the peripheral circuits being formed on a single substrate, a polarizer for giving a first state of polarization to at least one of images generated by the active matrix regions, a polarizer for giving a second state of polarization to an image other than the images to which the first state of polarization is given, and a projector for projecting the images generated in the active matrix regions of the liquid crystal panel on a screen with one image superimposed on another, wherein at least one of the images generated by the active matrix regions forms a white pattern just to cover such part of the other images that should be hidden from view.

In either of the image display systems comprising the aforementioned liquid crystal panel, the first and second states of polarization may be circular polarization with opposite rotating directions, or linear polarization with their planes of polarization intersecting at right angles to each other.

In one preferred embodiment, the first and second liquid crystal projectors project respective images on a common screen. The image projected by the second liquid crystal projector is circularly polarized with clockwise rotation as the image passes through a polarizing plate and a quarter-wave plate. On the other hand, the image projected by the first liquid crystal projector is circularly polarized with counterclockwise rotation as the image passes through a polarizing plate, a π-cell employing a liquid crystal cell for rotating the plane of polarization by 90 degrees and a quarter-wave plate.

The clockwise-rotating, circularly polarized image $A_n$ projected by the second liquid crystal projector and the counterclockwise-rotating, circularly polarized image $B_n$ projected by the first liquid crystal projector are therefore superimposed on the same screen.

In this embodiment, the image $A_n$ projected by the second liquid crystal projector is blank, or entirely white, while the image $B_n$ projected by the first liquid crystal projector contains specific visual information.

When viewed with the naked eye, a combination of the white image $A_n$ and the image $B_n$ containing the specific visual information projected on the screen appears totally white. This is because the image $B_n$ is masked by the white image $A_n$.

Any viewer who wished to see, or need to see, the visual information contained in the image $B_n$ should wear a dedicated viewing device equipped with an optical filter which selectively allows counterclockwise-rotating, circularly polarized light emitted by the first liquid crystal projector to pass through and look at the screen from the opposite side of the projectors. (It is to be noted that the rotating direction of the circularly polarized light is apparently reversed when viewed from the opposite side of the projectors.)

With this arrangement, it is possible to completely hide away the image $B_n$ from view of those people who are not willing to see, or need not see, the image $B_n$, just allowing specific viewers to see it. The embodiment may be modified such that the image $A_n$ forms a particular white pattern to mask a specific part of the image $B_n$. This makes it possible to hide specific pieces of visual information from public view.

The arrangement of the invention can be used for conveying visual information to concerned personnel only through a video screen which can be seen by the general public. Potential applications of this kind would be found in various industrial fields including the use in public spaces and buildings.

The invention also makes it possible to present a three-dimensional image to specific viewers by using a time-division display technique.

According to the invention, each image display system employs an integrated liquid crystal panel to produce individual images. The use of such integrated liquid crystal panels serves to offer such advantages as compact design, improved productivity and higher reliability of the image display systems.

DETAILED DESCRIPTION OF THE PREFERRED EMBODIMENTS

First Embodiment

Figure 1:
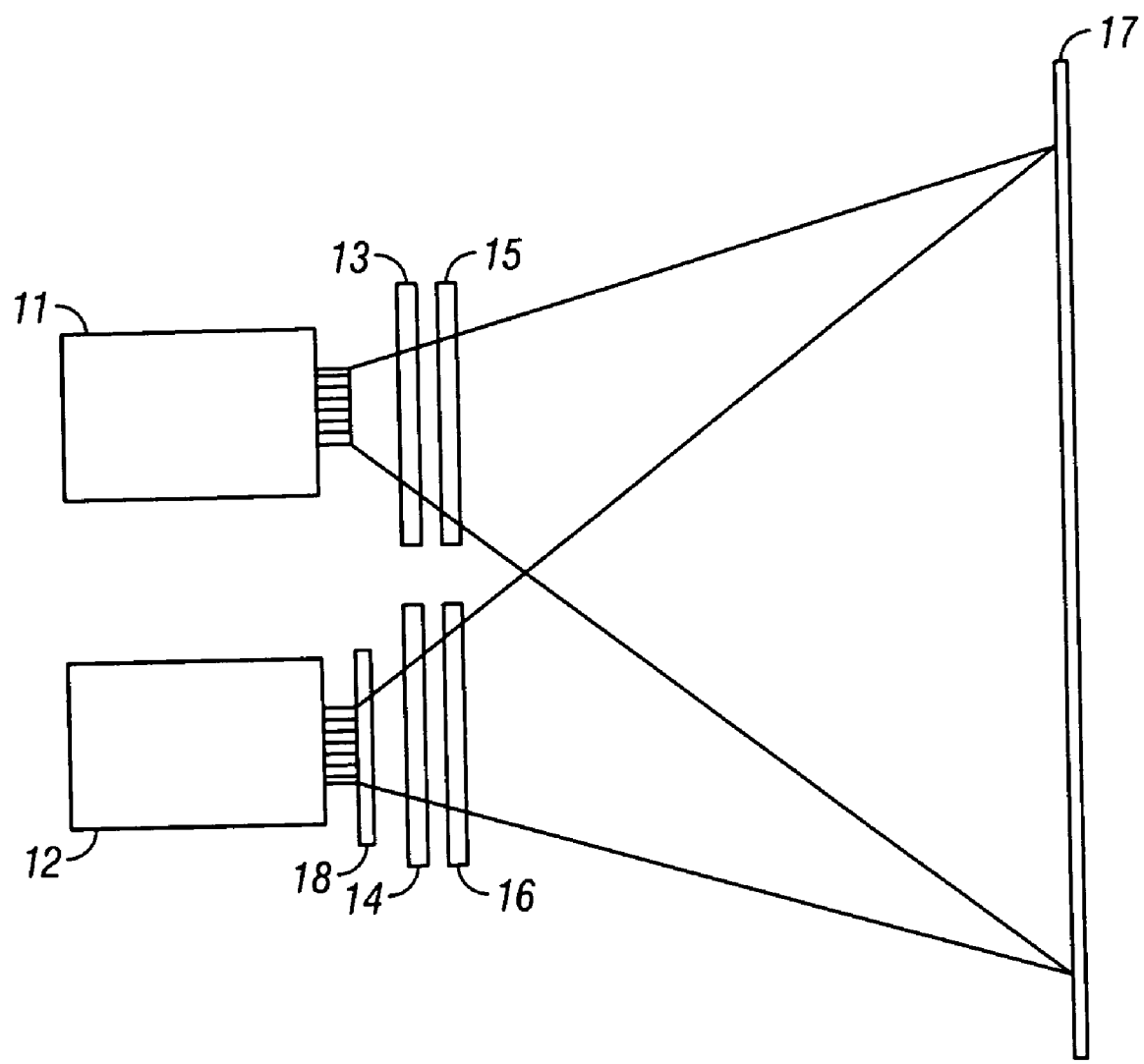
FIG. 1 is a schematic diagram showing the construction of an image display system which can selectively visualize a specific image according to a first embodiment of the invention.

FIG. 1 is a schematic diagram showing the construction of an image display system according to a first embodiment of the invention, comprising a pair of liquid crystal projectors 11 and 12 which are associated with such devices that cause light beams emitted by the respective projectors 11 and 12 to be circularly polarized in opposite rotating directions.

The liquid crystal projectors 11 and 12 of this embodiment are identical to each other and emit light beams polarized in the same direction. Images projected by them may either be monochrome or in color. The liquid crystal projector 11 which projects one image on a screen 17 is associated with a polarizing plate 13 and a quarter-wave plate 15 to produce a clockwise-rotating, circularly polarized beam, whereas the liquid crystal projector 12 which projects another image on the screen 17 is associated with a polarizing plate 18, a liquid crystal cell 14 for rotating the plane of polarization by 90 degrees and a quarter-wave plate 16 to produce a counterclockwise-rotating, circularly polarized beam.

Figure 2:
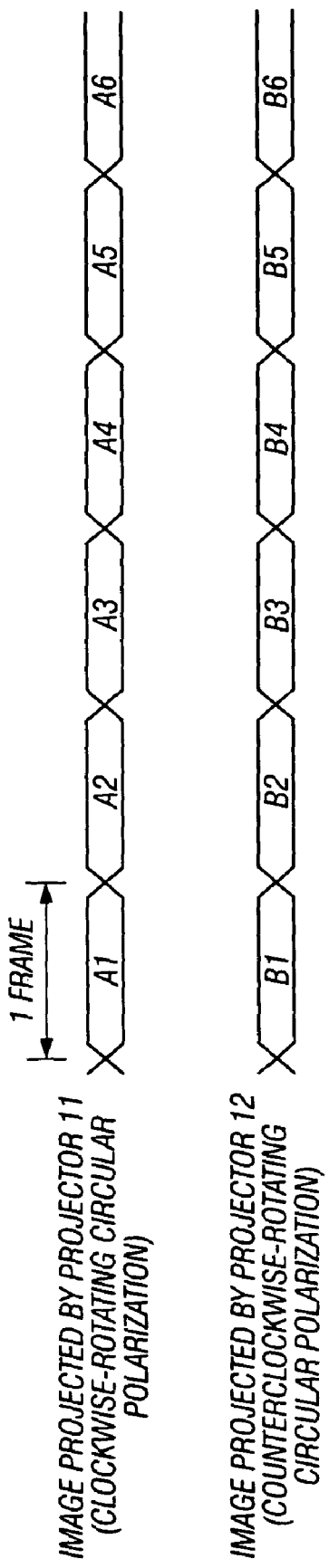
FIG. 2 is an operational timing chart of the image display system of FIG. 1.

The image projected by the liquid crystal projector 11 according to a timing chart shown in FIG. 2 is blank, or entirely white, while the image projected by the liquid crystal projector 12 contains specific image elements.

A group of viewers wear viewing devices incorporating filters which allow only the clockwise-rotating, circularly polarized beam emitted from the liquid crystal projector 11 to pass through. These viewers watch the screen 17 from the opposite side of the projectors 11 and 12 and can see the image $A_n$ produced by the clockwise-rotating, circularly polarized beam. This is because the counterclockwise-rotating, circularly polarized beam for producing the entirely white image can not pass through each viewing device.

The screen 17 looks totally white for those who are not wearing such viewing devices. This makes it possible to hide away a particular image from the sight of a second group of viewers for whom the image is not required.

The present embodiment is based on a combination of the clockwise- and counterclockwise-rotating, circularly polarized beams in operation. An alternative approach to selective visualization of projected images is to use a combination of different states of polarization, which involves two linearly polarized light beams, each polarized at right angles to the other. This alternative approach is advantageous in that the means for polarization and selective visualization can be much simplified.

The white image represented by $B_n$ in FIG. 2 is not necessarily required to cover the whole screen area. It may cover only such an area where the image $A_n$ is projected, or particular portions of the image $A_n$ to hide away specific image elements.

Second Embodiment

A second embodiment of the invention described below is based on a time-division display technique, in which two different images A and B are alternately presented on a single screen 37 in successive time frames. Although a viewer properly equipped with dedicated viewing means can see one of these images, nothing but an entirely white image is visible to the naked eye.

Figure 3:
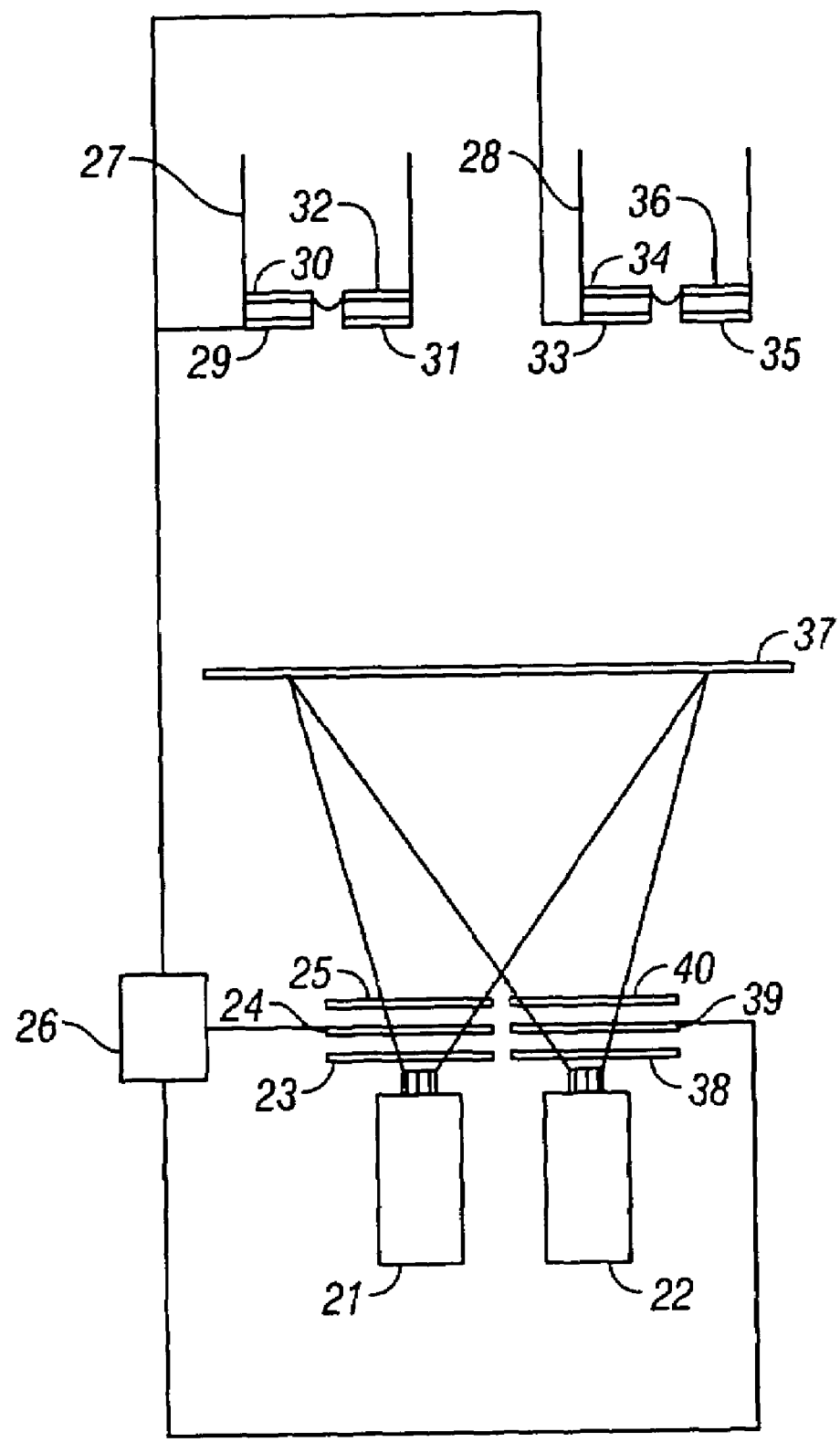
FIG. 3 is a schematic diagram showing the construction of an image display system which can selectively visualize a specific image according to a second embodiment of the invention.

FIG. 3 is a schematic diagram showing the construction of an image display system according to the second embodiment, comprising a pair of liquid crystal projectors 21 and 22. In FIG. 3, designated by the numeral 23 is a polarizing plate, designated by the numeral 24 is a π-cell and designated by the numeral 25 is a quarter-wave plate. Also, designated by the numeral 38 is a polarizing plate, designated by the numeral 39 is a π-cell and designated by the numeral 40 is a quarter-wave plate.

In this embodiment, the π-cells 24 and 39 are configured to operate in mutually reversed phases. More specifically, the π-cell 39 is set to an OFF state when the π-cell 24 is in an ON state. Conversely, the π-cell 39 is set to an ON state when the π-cell 24 is in an OFF state.

Designated by the numeral 26 is a controller for controlling the π-cells 24 and 39 and for opening and closing liquid crystal shutters 29 and 31 of a viewing device 27 as well as liquid crystal shutters 33 and 35 of a viewing device 28 in synchronism with the operation of the π-cells 24 and 39. In this embodiment, the images projected by the liquid crystal projectors 21 and 22 are superimposed on each other on the screen 37.

A light beam emitted by the liquid crystal projector 21 is circularly polarized as it passes through the polarizing plate 23, π-cell 24 and quarter-wave plate 25. More specifically, a clockwise-rotating, circularly polarized beam is produced when the π-cell 24 is ON, whereas a counterclockwise-rotating, circularly polarized beam is produced when the π-cell 24 is OFF.

Designated by the numerals 30, 32, 34 and 36 are optical filters which allow only such light beams that have specific states of circular polarization to pass through. The optical filters 30 and 32 selectively allow clockwise-rotating, circularly polarized extraneous light to pass through, whereas the optical filters 34 and 36 selectively allow counterclockwise-rotating, circularly polarized extraneous light to pass through.

Figure 4:
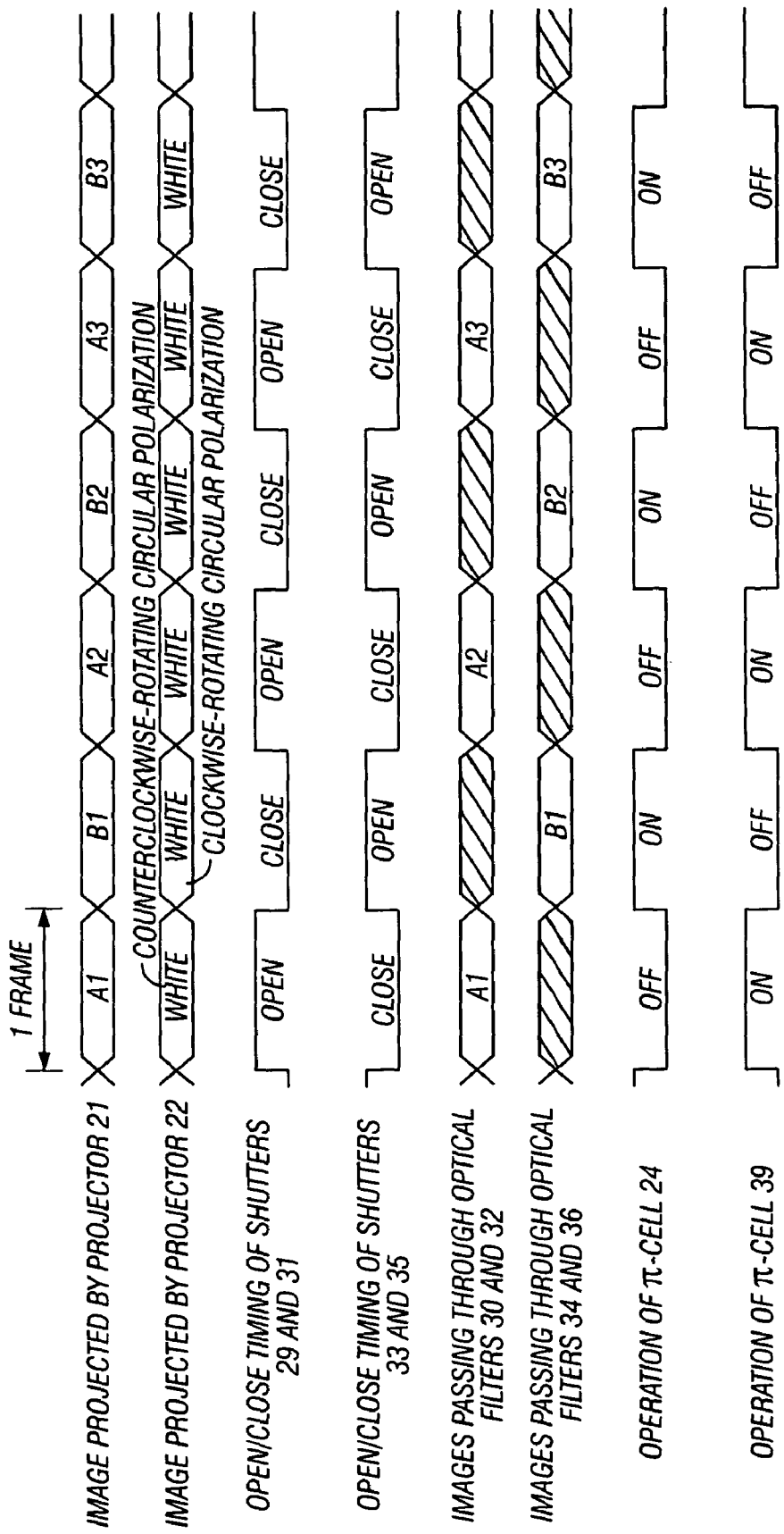
FIG. 4 is an operational timing chart of the image display system of FIG. 3.

A relationship between the images passing through the π-cell 24 and states of the individual liquid crystal shutters 29, 31, 33 and 35 is depicted in an operational timing chart shown in FIG. 4. In this embodiment, the light beam emitted from the liquid crystal projector 21 is divided in time, or multiplexed, to alternately project the two different images A and B.

As shown in FIG. 4, the liquid crystal projector 22 emits light for projecting an entirely white image. In the image display system of this embodiment which is operated as shown in FIG. 4, a viewer wearing the viewing device 27 can selectively see the image $A_n$ produced by the clockwise-rotating, circularly polarized beam, whereas a viewer wearing the viewing device 28 can selectively see the image $B_n$ produced by the counterclockwise-rotating, circularly polarized beam.

Since the rotating direction of polarization of the light beam emitted by the liquid crystal projector 22 for producing the entirely white image is opposite to that of the light beam for producing the images $A_n$ and $B_n$, the entirely white image projected by the liquid crystal projector 22 does not affect the viewer wearing the viewing device 27 or 28.

On the other hand, a viewer not wearing the viewing device 27 or 28 can see nothing but the entirely white image projected by the liquid crystal projector 22 because the images projected by the liquid crystal projector 21 are completely masked by the white image.

According to the construction of this embodiment, it is possible to selectively visualize the image A or B to the viewer wearing the dedicated viewing device 27 or 28, while those not wearing such viewing devices can not see any meaningful images.

Third Embodiment

A third embodiment of the invention described below is characterized in that it allows a specific viewer to see a three-dimensional image while presenting an entirely white image to other viewers.

Figure 5:
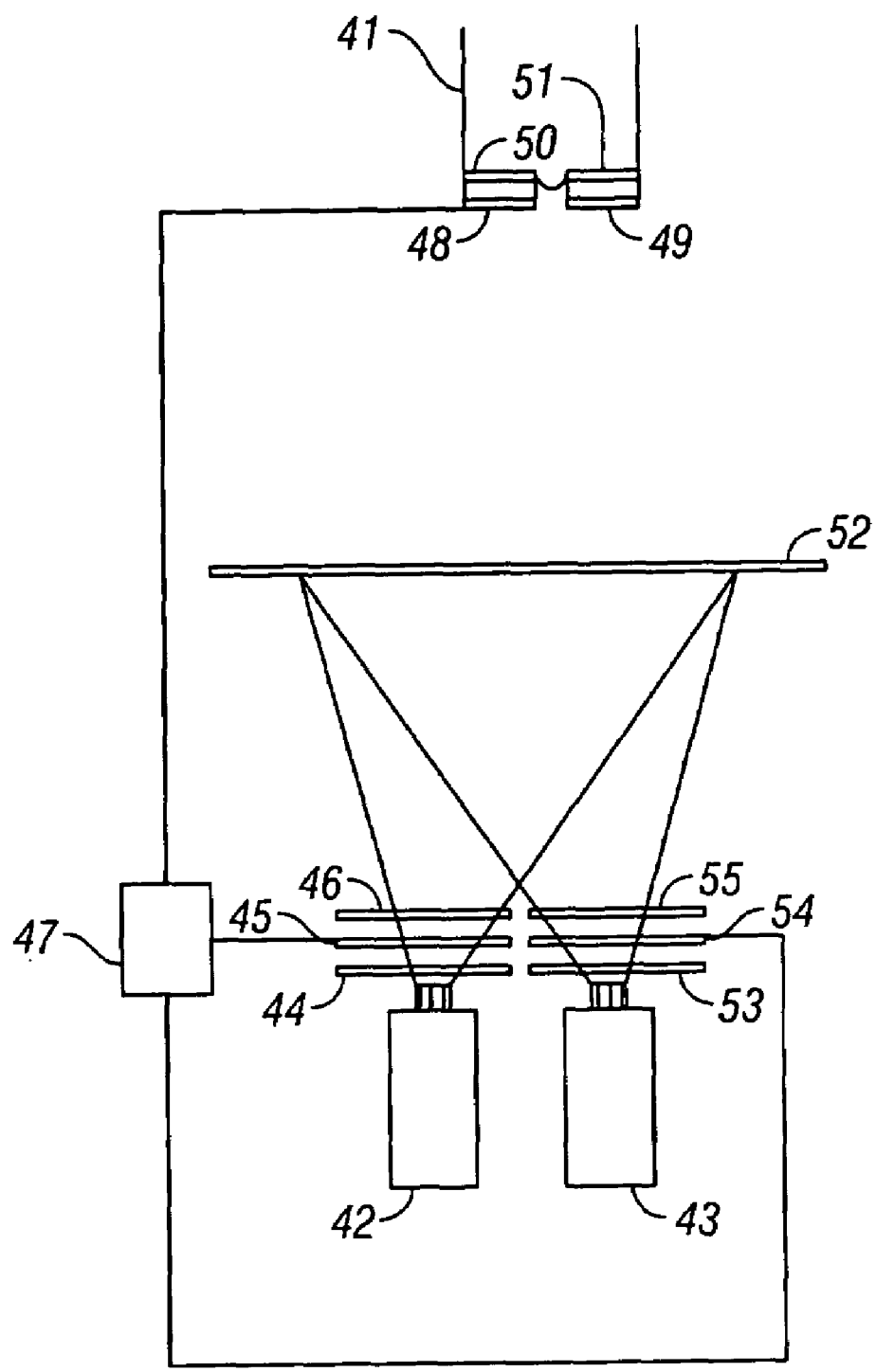
FIG. 5 is a schematic diagram showing the construction of an image display system which can selectively visualize a specific image according to a third embodiment of the invention.

FIG. 5 is a schematic diagram showing the construction of an image display system according to the third embodiment, in which images projected by liquid crystal projectors 42 and 43 are superimposed on one another on a screen 52. Although a viewer looking at the screen 52 with the naked eye can see only a totally white image, a viewer wearing a dedicated viewing device 41 can see a three-dimensional image.

Figure 6:
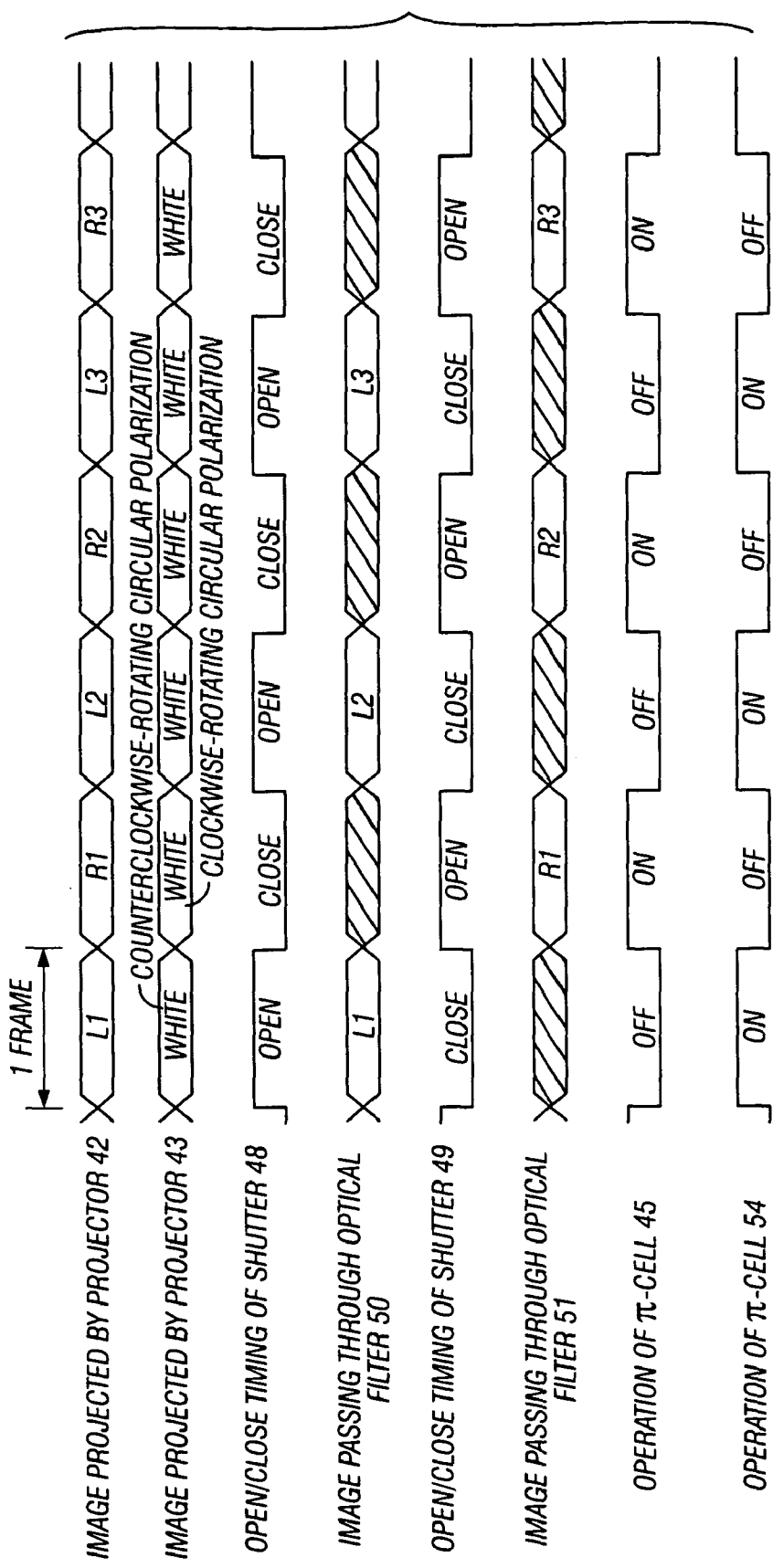
FIG. 6 is an operational timing chart of the image display system of FIG. 5.

The liquid crystal projector 42 shown in FIG. 5 alternately emits light waves for producing an image A for the right eye and an image B for the left eye on the screen 52 in accordance with a time-division scheme shown in FIG. 6. These images pass through a polarizing plate 44, a π-cell 45 and a quarter-wave plate 46 and are projected onto the screen 52.

ON and OFF states of the π-cell 45 are controlled by a controller 47 in accordance with the time-division scheme shown in FIG. 6. Although incident light passes through the π-cell 45 without any change when the π-cell 45 is in an OFF state, a vertically polarized component of the incident light passing through π-cell 45 is rotated by 90 degrees when it is set to an ON state.

On the other hand, a light beam emitted from the liquid crystal projector 43 is circularly polarized as it passes through a polarizing plate 53, a π-cell 54 and a quarter-wave plate 55. In this embodiment, the π-cells 45 and 54 are configured to operate in mutually reversed phases. More specifically, the π-cell 54 is set to an OFF state when the π-cell 45 is in an ON state. Conversely, the π-cell 54 is set to an ON state when the π-cell 45 is in an OFF state. This reverse phase operation of the two π-cells 45 and 54 is controlled by the controller 47.

The controller 47 also controls open/close operation of two liquid crystal shutters 48 and 49. Referring to FIG. 5, designated by the numerals 50 and 51 are optical filters which allow light beams circularly polarized in mutually opposite rotating directions to pass through. In this embodiment, their optical characteristics are set such that the optical filter 50 selectively allows the image A for the right eye to pass through while the optical filter 51 selectively allows the image B for the left eye to pass through, as shown in FIG. 6.

As shown in the operational timing chart of FIG. 6, the image A enters the right eye of the viewer wearing the viewing device 41 while the image B enters the left eye of the same viewer. As a result, it seems for the viewer as if a three-dimensional image is presented on the screen 52.

The entirely white image projected by the liquid crystal projector 43 is circularly polarized in opposite directions with respect to the images A and B which alternately enter the viewer's right and left eyes through the viewing device 41 in successive time frames in the time-division scheme. Therefore, the white image projected by the liquid crystal projector 43 is almost completely cut off by the viewing device 41 so that the effect of the white image on the viewer who sees the three-dimensional image is practically negligible.

On the other hand, a viewer watching the screen 52 with the naked eye can only see the totally white image. This means that the image display system of this embodiment makes it possible to enable a specific viewer to see a three-dimensional image while presenting the entirely white image, containing no visual information, to all other viewers.

Fourth Embodiment

Like the second embodiment, a fourth embodiment of the invention described below is based on the time-division display technique, in which two different images A and B are alternately presented on a single screen 76 in successive time frames. Although a viewer properly equipped with dedicated viewing means can see one of these images, nothing but a totally white image is visible to the naked eye.

Figure 7:
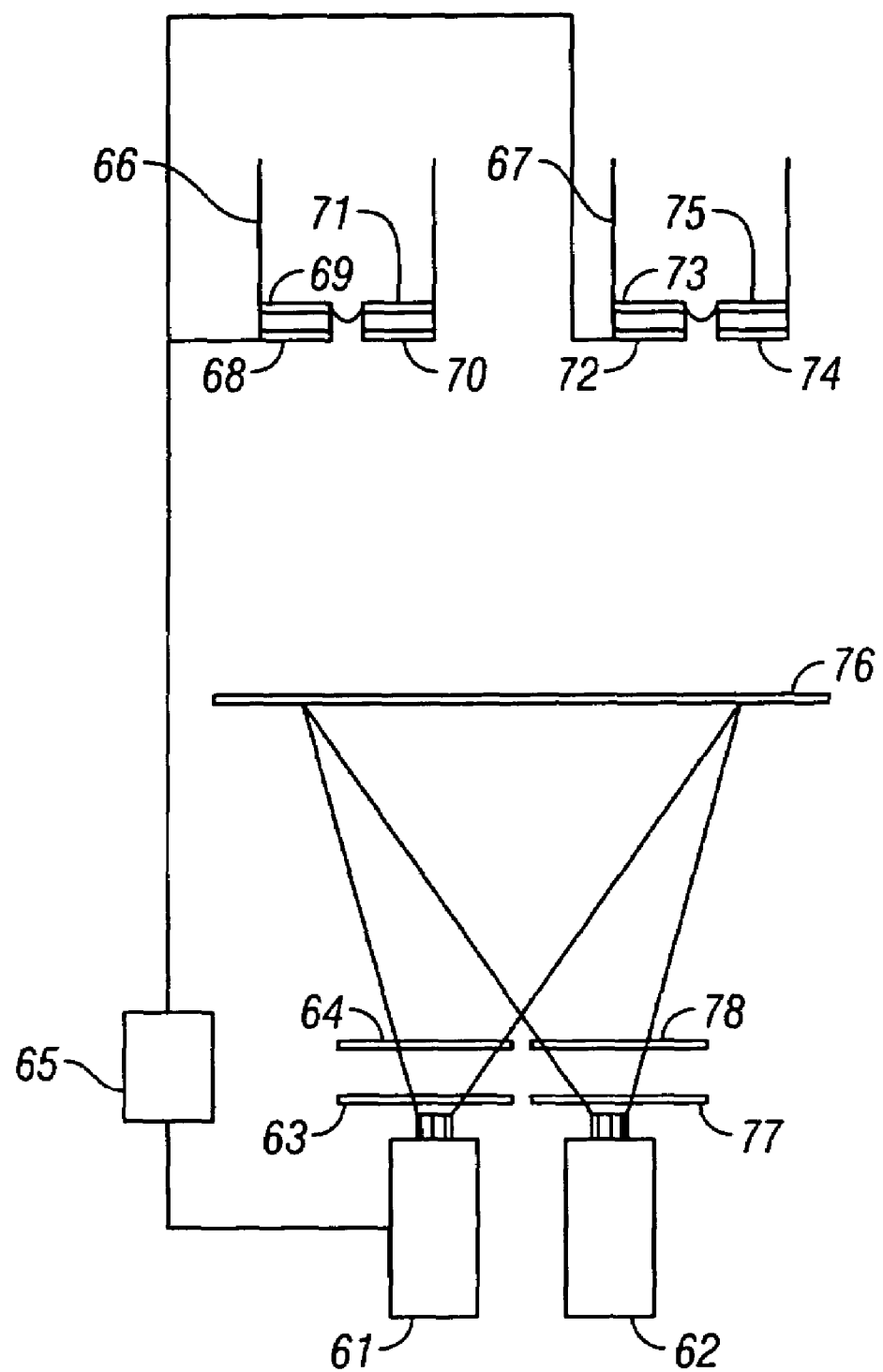
FIG. 7 is a schematic diagram showing the construction of an image display system which can selectively visualize a specific image according to a fourth embodiment of the invention.

FIG. 7 is a schematic diagram showing the construction of an image display system according to the fourth embodiment, comprising a pair of liquid crystal projectors 61 and 62. In FIG. 7, designated by the numeral 63 is a polarizing plate and designated by the numeral 64 is a quarter-wave plate. Also, designated by the numeral 77 is a polarizing plate and designated by the numeral 78 is a quarter-wave plate.

Designated by the numeral 65 is a controller for controlling open/close operations of liquid crystal shutters 68 and 70 of a viewing device 66 as well as liquid crystal shutters 72 an 74 of a viewing device 67 in synchronism with image display operation. In this embodiment, the images projected by the liquid crystal projectors 61 and 62 are superimposed on each other on the screen 76.

A light beam emitted by the liquid crystal projector 61 is circularly polarized as it passes through the polarizing plate 63 and quarter-wave plate 64.

Designated by the numerals 69, 71, 73 and 75 are optical filters which allow only such light beams that have specific states of circular polarization to pass through. The optical filters 69 and 71 selectively allow counterclockwise-rotating, circularly polarized extraneous light to pass through. Also, the optical filters 73 and 75 selectively allow counterclockwise-rotating, circularly polarized extraneous light to pass through.

Figure 8:
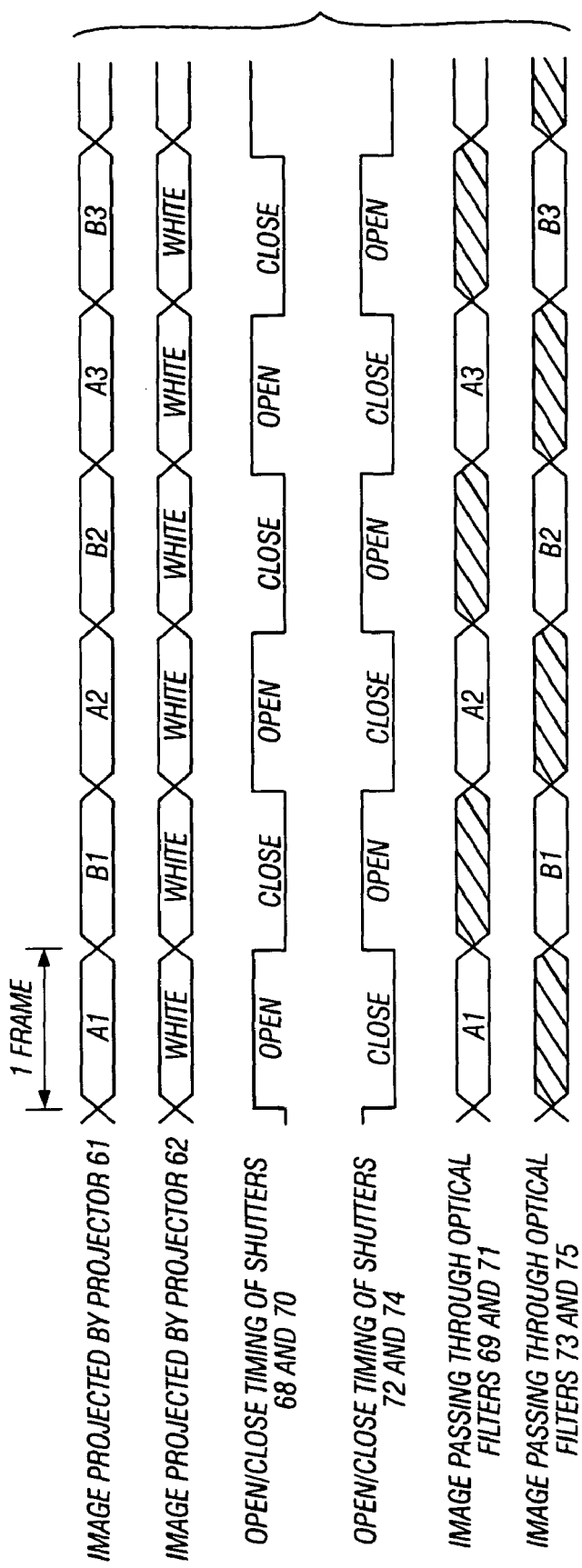
FIG. 8 is an operational timing chart of the image display system of FIG. 7.

A relationship among projection images and states of the individual liquid crystal shutters 68, 70, 72 and 74 is depicted in an operational timing chart shown in FIG. 8. In this embodiment, the light beam emitted from the liquid crystal projector 61 is divided in time, or multiplexed, to alternately project the two different images A and B.

As shown in FIG. 8, the liquid crystal projector 62 emits light for projecting an entirely white image. In the image display system of this embodiment which is operated as shown in FIG. 8, a viewer wearing the viewing device 66 can selectively see the image $A_n$ produced by the counterclockwise-rotating, circularly polarized beam, whereas a viewer wearing the viewing device 67 can selectively see the image $B_n$ produced by the counterclockwise-rotating, circularly polarized beam.

Since the rotating direction of polarization of the light beam emitted by the liquid crystal projector 62 for producing the entirely white image is clockwise, which is opposite to that of the light beam for producing the images $A_n$ and $B_n$, the entirely white image projected by the liquid crystal projector 62 does not affect the viewer wearing the viewing device 66 or 67.

On the other hand, a viewer not wearing the viewing device 66 or 67 can see nothing but the entirely white image projected by the liquid crystal projector 62 because the images projected by the liquid crystal projector 61 are completely masked by the white image.

Although the light beam emitted by the liquid crystal projector 61 for projecting the images $A_n$ and $B_n$ is circularly polarized with counterclockwise rotation while the light beam emitted by the liquid crystal projector 62 for projecting the entirely white image is circularly polarized with clockwise rotation in this embodiment, the invention is not limited to this arrangement. It may be modified in such a way that the light beam emitted by the liquid crystal projector 61 is circularly polarized with clockwise rotation and the light beam emitted by the liquid crystal projector 62 is circularly polarized with counterclockwise rotation.

According to the construction of this embodiment, it is possible to selectively visualize the image A or B to the viewer wearing the dedicated viewing device 66 or 67, while those not wearing such viewing devices can not see any meaningful images. Furthermore, this embodiment makes it possible to reduce the loss of image brightness compared to the second embodiment by eliminating π-cells.

Fifth Embodiment

Like the third embodiment, a fifth embodiment of the invention described below is characterized in that it allows a specific viewer to see a three-dimensional image while presenting an entirely white image to other viewers.

Figure 9:
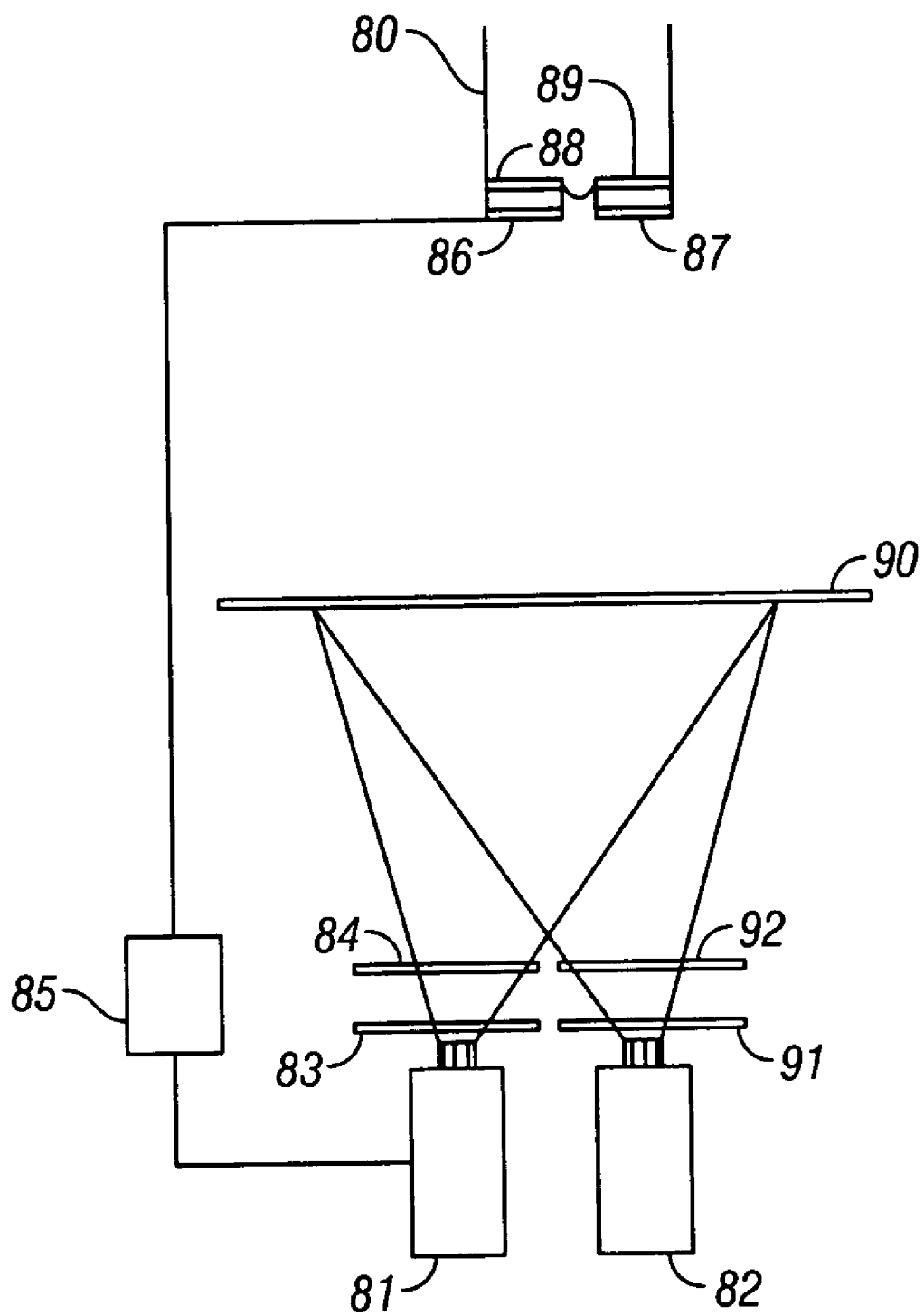
FIG. 9 is a schematic diagram showing the construction of an image display system which can selectively visualize a specific image according to a fifth embodiment of the invention.

FIG. 9 is a schematic diagram showing the construction of an image display system according to the fifth embodiment, in which images projected by liquid crystal projectors 81 and 82 are superimposed on one another on a screen 90. Although a viewer looking at the screen 90 with the naked eye can see only a totally white image, a viewer wearing dedicated viewing device 80 can see a three-dimensional image.

Figure 10:
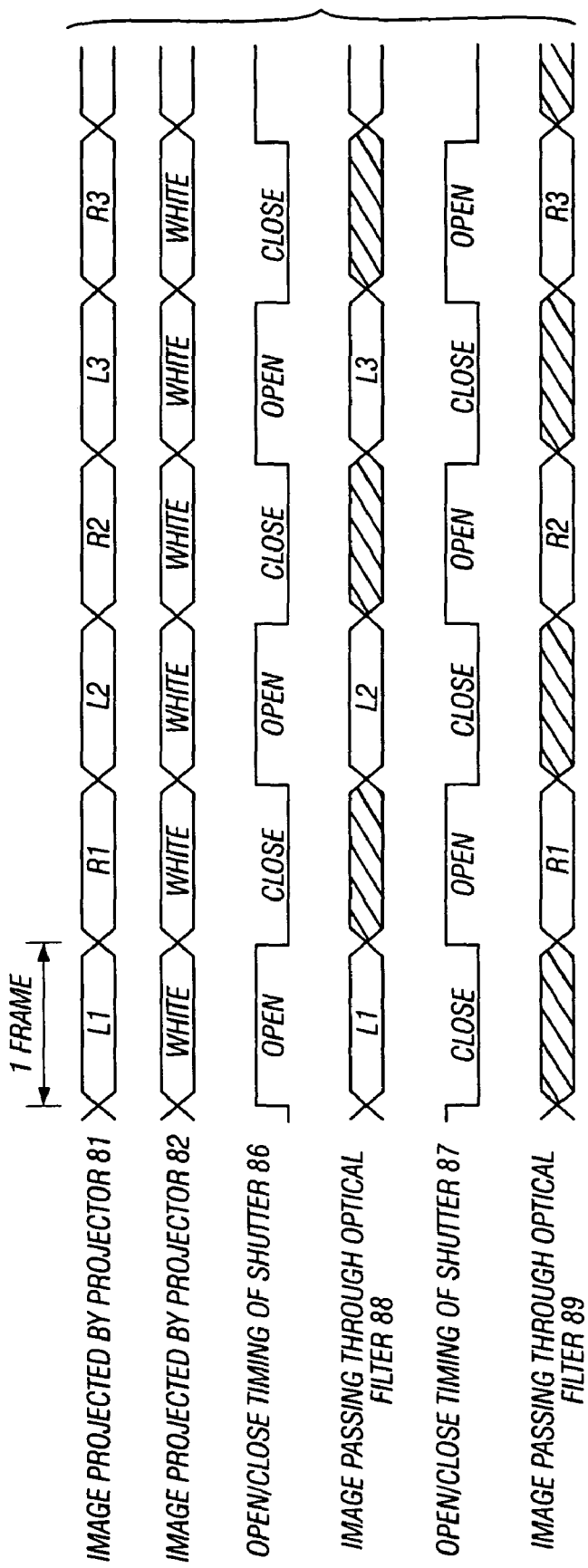
FIG. 10 is an operational timing chart of the image display system of FIG. 9.

The liquid crystal projector 81 shown in FIG. 9 alternately emits light waves for producing an image $L_n$ for the left eye and an image $R_n$ for the right eye on the screen 90 in accordance with a time-division scheme shown in FIG. 10. These images pass through a polarizing plate 83 and a quarter-wave plate 84 and are projected onto the screen 90.

A light beam emitted from the liquid crystal projector 82 is circularly polarized as it passes through a polarizing plate 91 and a quarter-wave plate 92.

Designated by the numeral 85 is a controller for controlling open/close operations of liquid crystal shutters 86 and 87 of the viewing device 80 in synchronism with image display operation. In this embodiment, the images projected by the liquid crystal projectors 81 and 82 are superimposed on each other on the screen 90.

Designated by the numerals 88 and 89 are optical filters which allow only such light beams that have specific states of circular polarization to pass through. The optical filters 88 and 89 of this embodiment selectively allow counterclockwise-rotating, circularly polarized extraneous light to pass through.

As shown in the operational timing chart of FIG. 10, the image $L_n$ enters the left eye of the viewer wearing the viewing device 80 while the image $R_n$ enters the right eye of the same viewer. As a result, it seems for the viewer as if a three-dimensional image is presented on the screen 90.

The entirely white image projected by the liquid crystal projector 82 is circularly polarized with clockwise rotation, which is opposite to the rotating direction of polarization (counterclockwise) of the images $L_n$ and $R_n$ alternately entering the viewer's right and left eyes. Therefore, the white image projected by the liquid crystal projector 82 is almost completely cut off by the viewing device 80 so that the effect of the white image on the viewer who sees the three-dimensional image is practically negligible.

On the other hand, a viewer watching the screen 90 with the naked eye can only see the entirely white image. The image display system of this embodiment makes it possible to enable a specific viewer to see a three-dimensional image while presenting the entirely white image, containing no visual information, to other viewers who looks at the screen 90 with the naked eye.

Although the light beam emitted by the liquid crystal projector 81 for projecting the images $L_n$ and $R_n$ is circularly polarized with counterclockwise rotation while the light beam emitted by the liquid crystal projector 82 for projecting the entirely white image is circularly polarized with clockwise rotation in this embodiment, the invention is not limited to this arrangement. It may be modified in such a way that the light beam emitted by the liquid crystal projector 81 is circularly polarized with clockwise rotation and the light beam emitted by the liquid crystal projector 82 is circularly polarized with counterclockwise rotation.

This embodiment makes it possible to reduce the loss of image brightness compared to the third embodiment by eliminating π-cells.

Sixth Embodiment

Figure 11:
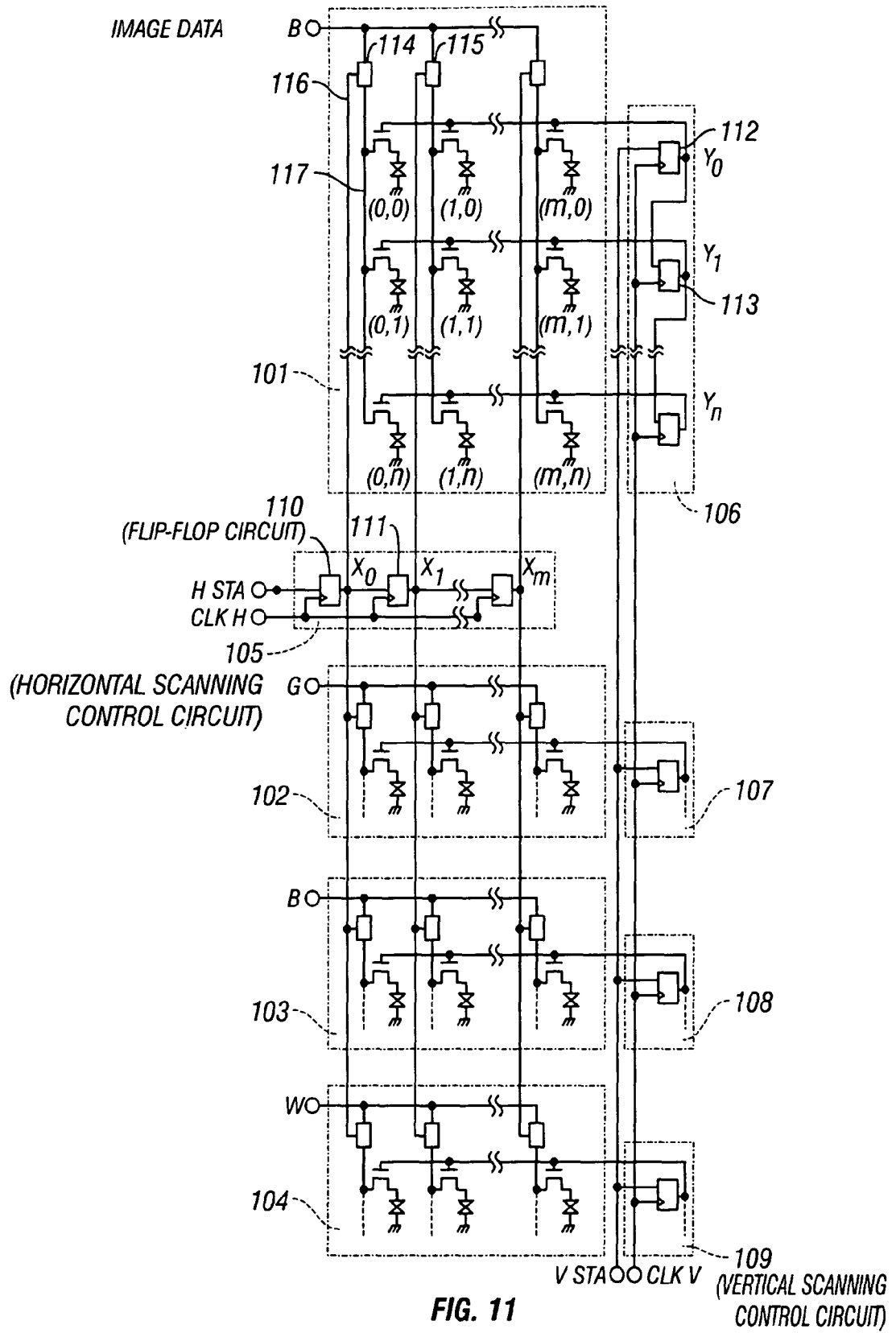
FIG. 11 is a circuit diagram showing a general configuration of an integrated liquid crystal panel employed in a sixth embodiment of the invention.

FIG. 11 is a circuit diagram showing a general configuration of an integrated liquid crystal panel 207 employed in a sixth embodiment of the invention. As shown in FIG. 11, the integrated liquid crystal panel 207 comprises active matrix regions 101 to 104, a horizontal scanning control circuit 105 for controlling horizontal scanning operation in these active matrix regions 101–104, a vertical scanning control circuit 106 for controlling vertical scanning operation in the active matrix region 101, a vertical scanning control circuit 107 for controlling vertical scanning operation in the active matrix region 102, a vertical scanning control circuit 108 for controlling vertical scanning operation in the active matrix region 103, and a vertical scanning control circuit 109 for controlling vertical scanning operation in the active matrix region 104.

All these circuit elements including the active matrix regions 101–104, the horizontal scanning control circuit 105 and the vertical scanning control circuits 106–109 are arranged on a single substrate of glass (or quartz) in an integrated form using thin-film transistor technology. Preferably, thin-film transistors are constructed from a thin crystalline silicon film.

In the circuit configuration of this embodiment, the active matrix regions 101–104 and their peripheral drive circuits are integrally formed on one substrate. This configuration is advantageous in that it provides substantial labor savings and production cost reduction compared to conventional manufacturing methods, in which peripheral circuits are constructed as integrated circuits (ICs) on a substrate and interconnected by use of tape automated bonding (TAB) technology. The configuration of the embodiment is also advantageous in that the overall construction can be reduced in size. As can be seen from FIG. 11, some of the peripheral circuits are integrally arranged with the individual active matrix regions 101–104. This is particularly effective for enhancing the aforementioned advantages of this embodiment.

According to the present embodiment, the individual active matrix regions 101–104 can produce different images independently of one another. Operations of the individual active matrix regions 101–104 are synchronously controlled by a common horizontal scanning control clock signal (CLK H) and a common vertical scanning control clock signal (CLK V).

In the integrated liquid crystal panel 207 shown in FIG. 11, the active matrix regions 101 to 103 generate red, green and blue (RGB) color images, respectively, while the active matrix region 104 generates an entirely white image. A color image produced from the RGB colors and the entirely white image are superimposedly projected onto a common screen 210, as will be described later.

Figure 12:
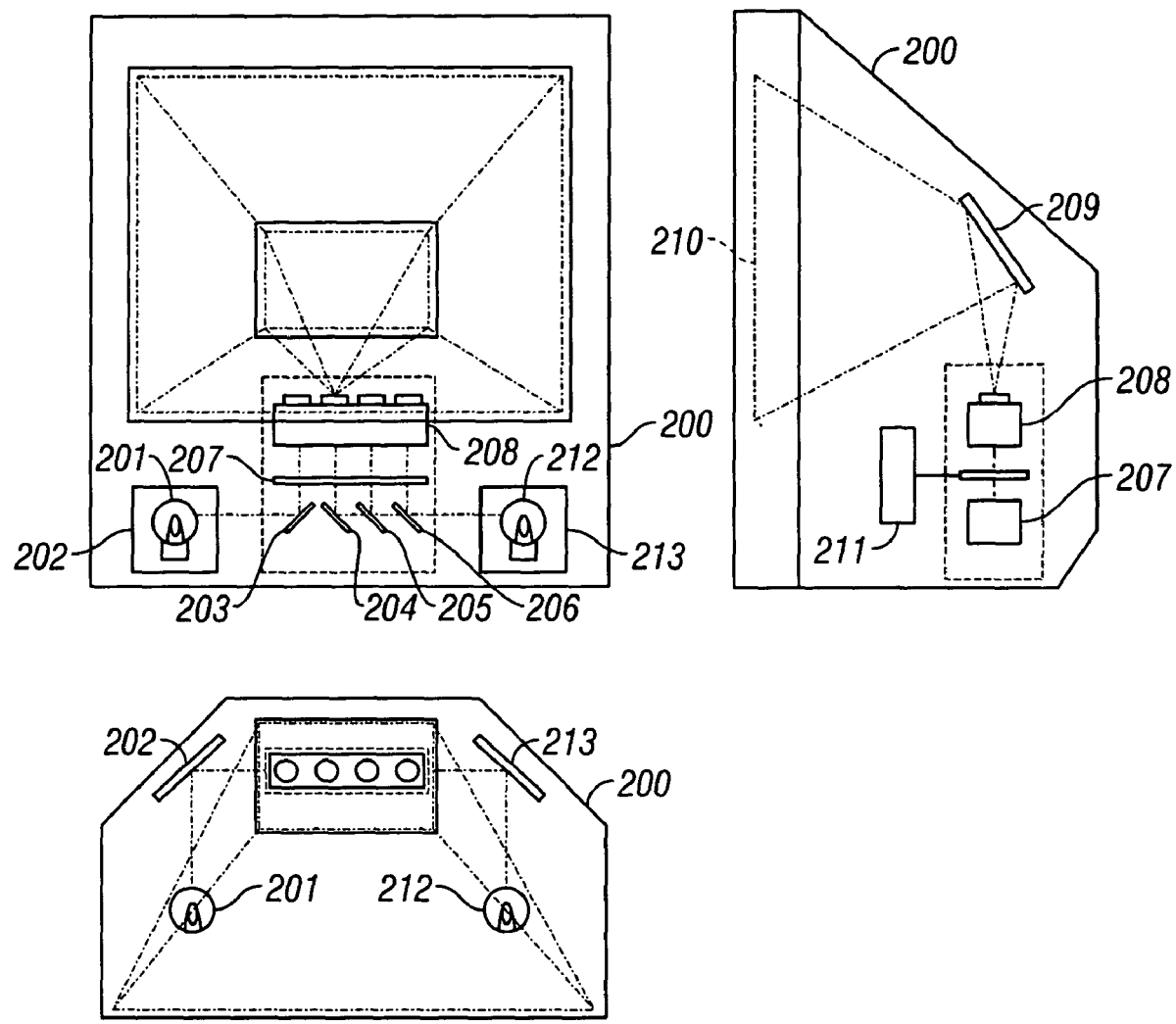
FIG. 12 is a diagram showing the construction of a projection-type image display system employing the liquid crystal panel depicted in FIG. 11.

FIG. 12 is a diagram showing the construction of a projection-type image display system 200 employing the integrated liquid crystal panel 207 of FIG. 11. Referring to FIG. 12, white light (W) emitted from a light source 201 is reflected by mirrors 202 and 203 and falls upon the active matrix region 104 of the integrated liquid crystal panel 207. The active matrix region 104 is not required if it is needed to show a full-screen white image continuously. However, if it is desired to selectively hide away a certain portion of an image produced by the active matrix regions 101 to 103, it is essential to produce an overlapping white image by the active matrix region 104.

On the other hand, white light emitted from a light source 212 is reflected by a mirror 213 in the direction of dichroic mirrors 204–206. The red (R), green (G) and blue (B) colors are separated from the reflected white light as the dichroic mirror 206 selectively reflects components of a blue (B) light wavelength band, the dichroic mirror 205 selectively reflects components of a green (G) light wavelength band, and the dichroic mirror 204 selectively reflects components of a red (R) light wavelength band.

The individual colors fall upon the integrated liquid crystal panel 207 of which details are depicted in FIG. 11 and undergo specific optical modulation. Signals required for controlling the liquid crystal panel 207 are fed from a control unit 211 to the liquid crystal panel 207. Individual images formed through optical modulation by the liquid crystal panel 207 are polarized into specific states of polarization as they pass through an optical unit 208.

The optical unit 208 incorporates polarizers for transforming the RGB images into clockwise-rotating, circularly polarized beams. Each of these polarizers comprises a polarizing plate and a quarter-wave plate, or a polarizing plate, π-cell and a quarter-wave plate. Also incorporated in the optical unit 208 is a polarizer for transforming the entirely white image into a counterclockwise-rotating, circularly polarized beam.

The red (R), green (G), blue (B) and white (W) images thus produced are projected onto the screen 210 with one image superimposed on another through projection lenses incorporated in the optical unit 208.

Figure 13:
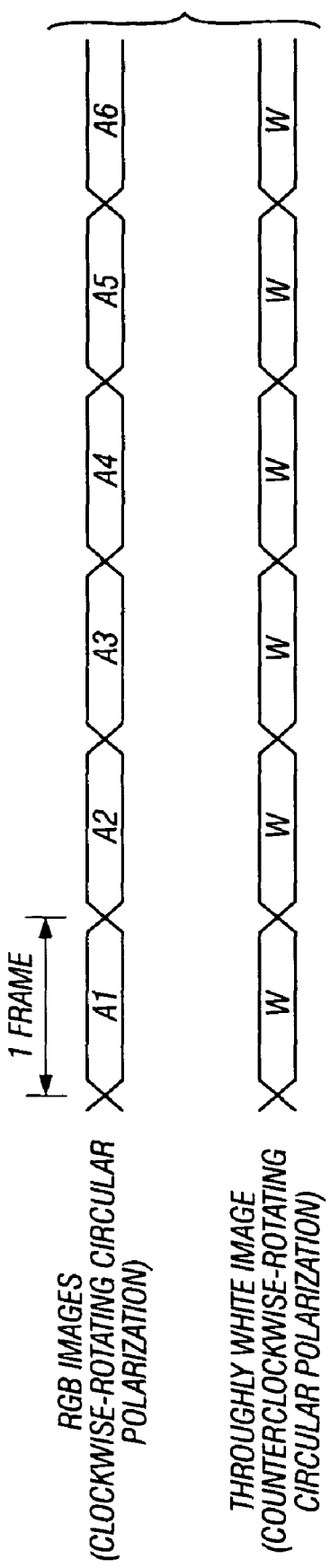
FIG. 13 is a timing chart describing operation for presenting images with the image display system of FIG. 12.

FIG. 13 is a timing chart describing operation for presenting images with the projection-type image display system of FIG. 12. As noted in FIG. 13, light beams for projecting the RGB images generated by the active matrix regions 101 to 103 are circularly polarized with clockwise rotation by the optical unit 208 and superimposed on one another to form a combined color image A on the screen 210.

On the other hand, the white image generated by the active matrix region 104 is circularly polarized with counterclockwise rotation by the optical unit 208 and superimposingly projected upon the RGB images on the screen 210.

If a viewer looks at the screen 210 with the naked eye, the screen 210 will be entirely white because the RGB images are masked by the white image. If the viewer looks at the screen 210 through an optical filter which selectively allows clockwise-rotating, circularly polarized light to pass through, it would be possible to see the color image A because the counterclockwise-rotating, circularly polarized white image is almost completely interrupted. This can be achieved by wearing a dedicated viewing device incorporating optical filters which selectively allow clockwise-rotating, circularly polarized light to pass through, for instance.

The image display system of this embodiment makes it possible to enable only those viewers who wear such a dedicated viewing device incorporating the optical filters to see the color image A while presenting the entirely white image, containing no visual information, to other viewers who looks at the screen 210 with the naked eye.

Although the color image A is entirely masked by the white image according to this embodiment, it may be modified in such a way that the white image overlap part of the color image A. Moreover, the overlapping image need not necessarily be white, but may be of any color which would be found to be effective for hiding away an underlying image by way of experiments.

The aforementioned construction of this embodiment can be used for conveying visual messages to concerned personnel only by use of video screens which can be seen by the general public. Potential applications of this kind would be found in various industrial fields, including airports, railway stations, shopping centers, and so forth. What is required for intended recipients of such messages is to wear special viewing devices capable of allowing light having a specific state of polarization to pass through when they look at the screen 210.

Operation of the liquid crystal panel 207 of FIG. 11 is now briefly described. The following discussion focuses on the operation of the active matrix region 101 for the simplicity of explanation. It is to be noted that the other active matrix regions 102–104 operate in a similar way to the active matrix region 101.

Referring to FIG. 11, designated by the numerals 110, 111 and 112 are flip-flop circuits, each of which can assume two stable states. As an example, if a rising edge of the horizontal scanning control clock signal CLK H enters the flip-flop circuit 111 when its input (point $X_0$) is set to H (logic high) and its output (point $X_1$) is set to L (logic low), the output of the flip-flop circuit 111 turns to H, or an H level appears at point $X_1$. This state is maintained until another rising edge of the clock signal CLK H enters.

On the contrary, if a rising edge of the clock signal CLK H enters the flip-flop circuit 111 when its input is set to L and its output is set to H, the output of the flip-flop circuit 111 turns to L. If a rising edge of the clock signal CLK H enters the flip-flop circuit 111 when both of its input and output are set to L, the output of the flip-flop circuit 111 remains L.

First, a rising edge of the vertical scanning control clock signal CLK V enters the flip-flop circuit 112 of the vertical scanning control circuit 106. At this point, the clock signal CLK V makes a horizontal scanning timing enable signal H STA effective.

Specifically, when the rising edge of the CLK V signal enters the flip-flop circuit 112 in a condition where an H level of the H STA signal is applied to an input of the flip-flop circuit 112, the output of the flip-flop circuit 112 becomes H. As a result, the signal level of line $Y_0$ is set to H, and this causes thin-film transistors of individual pixels in line $Y_0$, denoted by addresses (0, 0), (1, 0), . . . , (m, 0), to become all ON.

As the rising edge of the horizontal scanning control clock signal CLK H enters the flip-flop circuit 110 in this condition, the horizontal scanning timing enable signal H STA is made effective. As a result, the signal level at point $X_0$ is set to H.

Since inputs of the flip-flop circuits 111 and onward are all at an L level when the rising edge of the clock signal CLK H has just entered, outputs of the flip-flop circuits 111 and onward are all at an L level in this condition.

As an image sampling signal line 116 become an H level in the aforementioned condition, a sample hold circuit 114 acquires image data B, and signals corresponding to such image data flows in an image signal line 117. More specifically, specific image signals are applied to source electrodes of thin-film transistors of individual pixels denoted by addresses (0, 0), (0, 1), . . . , (0, n). Since the thin-film transistors of the pixels denoted by addresses (0, 0), (1, 0), . . . , (m, 0) are all ON in this condition, image information is written into the pixel designated by address (0, 0) only.

Next, a succeeding rising edge of the clock signal CLK H causes the outputs of the flip-flop circuits 110 and 111 to become L and H, respectively. The signal level at point $X_1$ is set to H. In this condition, all points denoted by $X_m$, excluding point $X_1$, are set to L. As a result, a sample hold circuit 115 acquires specific image data and image information is written into address (1, 0).

Image information for addresses (0, 0) through (m, 0) is sequentially written in synchronism with the clock signal CLK H in this way.

When the image information for line $Y_0$ has been fully written into the respective addresses, the output of the flip-flop circuit 112 becomes L at a succeeding rising edge of the clock signal CLK V and the output of a flip-flop circuit 113 becomes H. Then, image information for line $Y_1$ is written into relevant addresses following the same sequence as described above. Image information for individual pixels is sequentially written line by line in this manner, and image presentation for one frame is finished when address (m, n) is reached. Frames are refreshed at 30 Hz, for instance, to continuously present an on-screen image.

Seventh Embodiment

Figure 14:
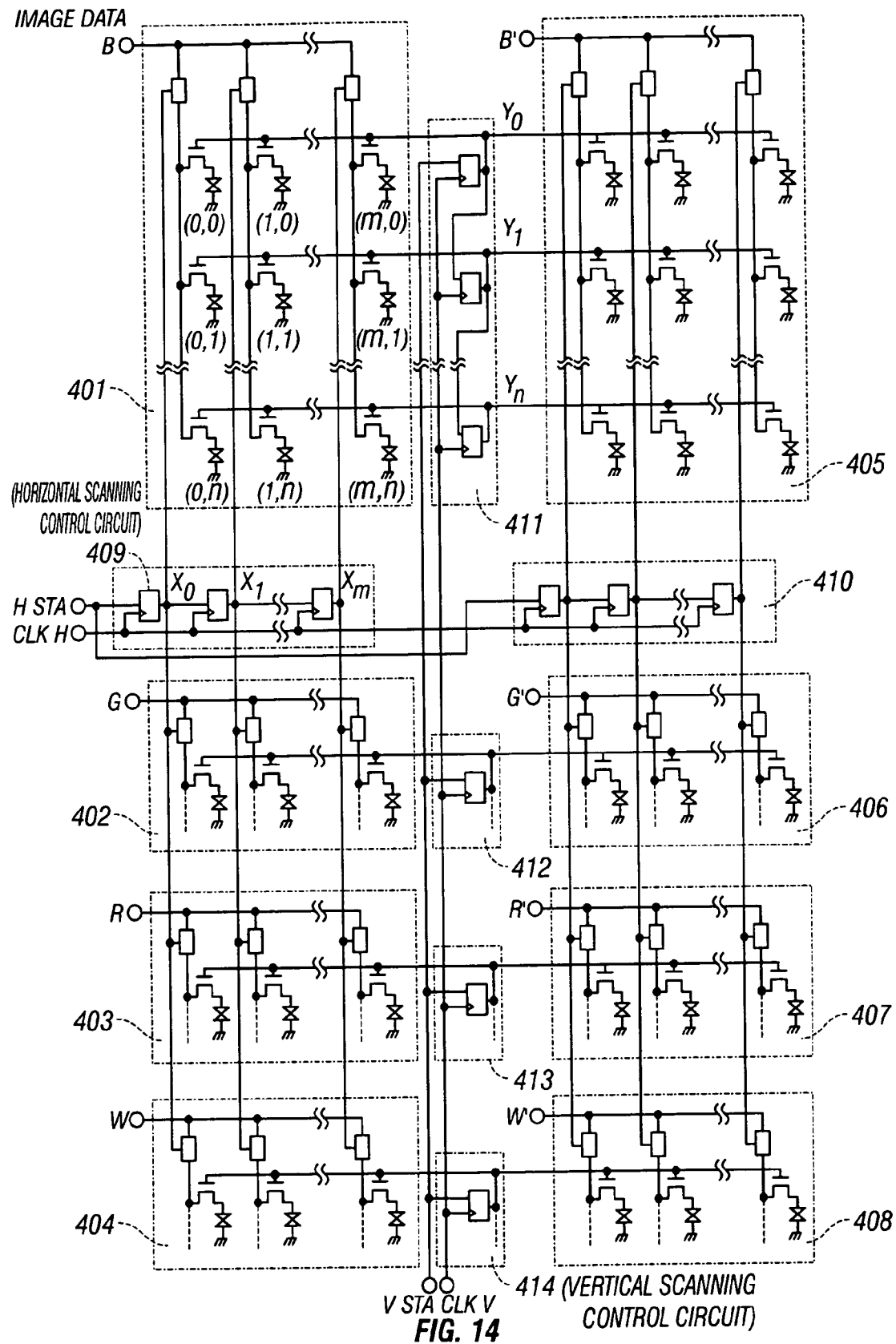
FIG. 14 is a circuit diagram showing a general configuration of an integrated liquid crystal panel employed in a seventh embodiment of the invention.

A seventh embodiment of the invention described below is characterized in that it has basically the same construction as the sixth embodiment but employs an integrated liquid crystal panel as shown in FIG. 14 instead of the liquid crystal panel 207. Compared to the liquid crystal panel 207 of FIG. 11, the liquid crystal panel of FIG. 14 has an expanded circuit configuration and can produce two sets of RGB color images as well as two overlapping entirely white images at the same time.

According to the configuration of FIG. 14, a horizontal scanning control circuit 409 controls horizontal scanning operation in active matrix regions 401 to 404 while a horizontal scanning control circuit 410 controls horizontal scanning operation in active matrix regions 405 to 408.

On the other hand, a vertical scanning control circuit 411 controls vertical scanning operation in the active matrix regions 401 and 405, a vertical scanning control circuit 412 controls vertical scanning operation in the active matrix regions 402 and 406, a vertical scanning control circuit 413 controls vertical scanning operation in the active matrix regions 403 and 407, and a vertical scanning control circuit 414 controls vertical scanning operation in the active matrix regions 404 and 408.

The liquid crystal panel thus constructed can be used as a high-brightness display screen or for producing a three-dimensional image, for instance. Each of the horizontal and vertical scanning control circuits 409–414 controls a plurality of active matrix regions in this embodiment. This arrangement offers such advantages as compact design, improved productivity and higher reliability.

Eighth Embodiment

An eighth embodiment of the invention has basically the same construction as the sixth embodiment but its active matrix regions 101 to 103 are used to produce a common black-and-white image. This embodiment makes it possible to obtain an extremely bright image as three independently generated images are superimposed on one another, although they are black-and-white.

In the construction of the image display system shown in FIG. 14, semitransparent mirrors should substitute for the dichroic mirrors 204–206 to achieve high brightness. Alternatively, separate light sources may be provided at positions corresponding to the active matrix regions 101 to 103 of the liquid crystal panel 207.

Ninth Embodiment

A ninth embodiment of the invention has basically the same construction as the sixth embodiment but employs simple polarizing plates as means for creating specific states of polarization. The polarizing plates of this embodiment should be able to linearly polarize white and color images in two mutually perpendicular planes of polarization. It should be appreciated that this approach serves to simplify the construction of the means for creating specific states of polarization and of optical filters which selectively allow polarized light having the specific states of polarization to pass through.

What is claimed is:

1. A display system comprising:
a first active matrix circuit for generating a first image comprising at least one of a red image, a green image and a blue image;
a second active matrix circuit for generating a second image comprising a white image;
a horizontal scanning control circuit for controlling horizontal scanning operation in the first and second active matrix circuits;
a first vertical scanning control circuit for controlling vertical scanning operation in the first active matrix circuit; and a second vertical scanning control circuit for controlling vertical scanning operation in the second active matrix circuit, wherein the second image overlaps the first image.

2. The display system according to claim 1, wherein each of the first and second active matrix circuits is formed by a plurality of thin film transistors.

3. The display system according to claim 1, wherein each of the first and second vertical scanning control circuits is formed by a plurality of thin film transistors.

4. The display system according to claim 1 wherein the horizontal scanning control circuit is formed by a plurality of thin film transistors.

5. A display system comprising:
a first active matrix circuit for generating at least one of a red image, a green image and a blue image;
a second active matrix circuit for generating a white image;
a horizontal scanning control circuit for controlling horizontal scanning operation in the first and second active matrix circuits;
a first vertical scanning control circuit for controlling vertical scanning operation in the first active matrix circuit;
a second vertical scanning control circuit for controlling vertical scanning operation in the second active matrix circuit;
a polarizer for giving a first state of polarization to at least one of the red, green and blue images; and
a polarizer for giving a second state of polarization to the white image.

6. The display system according to claim 5, wherein each of the first and second active matrix circuits is formed by a plurality of thin film transistors.

7. The display system according to claim 5, wherein each of the first and second vertical scanning control circuits is formed by a plurality of thin film transistors.

8. The display system according to claim 5, wherein the horizontal scanning control circuit is formed by a plurality of thin film transistors.

9. A display system comprising:
a liquid crystal panel having first and second active matrix regions and circuits for controlling horizontal and/or vertical scanning operation in the first and second active matrix regions;
a first polarizer for giving a first state of polarization to a first image generated by the first active matrix region; and
a second polarizer for giving a second state of polarization to a second image generated by the second active matrix region,
wherein the first image comprises at least one of red, green and blue images, and
wherein the second image is entirely white.

10. The display system according to claim 9, wherein the first and second states of polarization are circular polarization with opposite rotating directions.

11. The display system according to claim 9, wherein the first and second states of polarization are linear polarization with their planes of polarization intersecting at right angles with each other.

12. A display system comprising:
a liquid crystal panel having first and second active matrix regions and circuits for controlling horizontal and/or vertical scanning operation in the first and second active matrix regions;
a first polarizer for giving a first state of polarization to a first image generated by the first active matrix region; and
a second polarizer for giving a second state of polarization to a second image generated by the second active matrix region;
wherein the first image comprises at least one of red, green and blue images,
wherein the second image is entirely white, and
wherein the first and second images are sequentially generated to fit in successive time frames in accordance with a time-division display scheme.

13. The display system according to claim 12, wherein the first and second states of polarization are circular polarization with opposite rotating directions.

14. The display system according to claim 12, wherein the first and second states of polarization are linear polarization with their planes of polarization intersecting at right angles with each other.

15. A method for driving a display system comprising the steps of:
generating a first image having a first state of polarization;
generating a second image having a second state of polarization;
wherein the first image comprises at least one of red, green and blue images,
wherein the second image is entirely white, and
wherein the first and second images are sequentially generated to fit in successive time frames in accordance with a time-division display scheme.

16. The method according to claim 15 wherein the first and second states of polarization are circular polarization with opposite rotating directions.

17. The method according to claim 15 wherein the first and second states of polarization are linear polarization with their planes of polarization intersecting at right angles with each other.

* * * * *